Sept. 13, 1955   H. F. PECKWORTH   2,717,615
REINFORCED CONCRETE PIPE
Original Filed Dec. 10, 1949
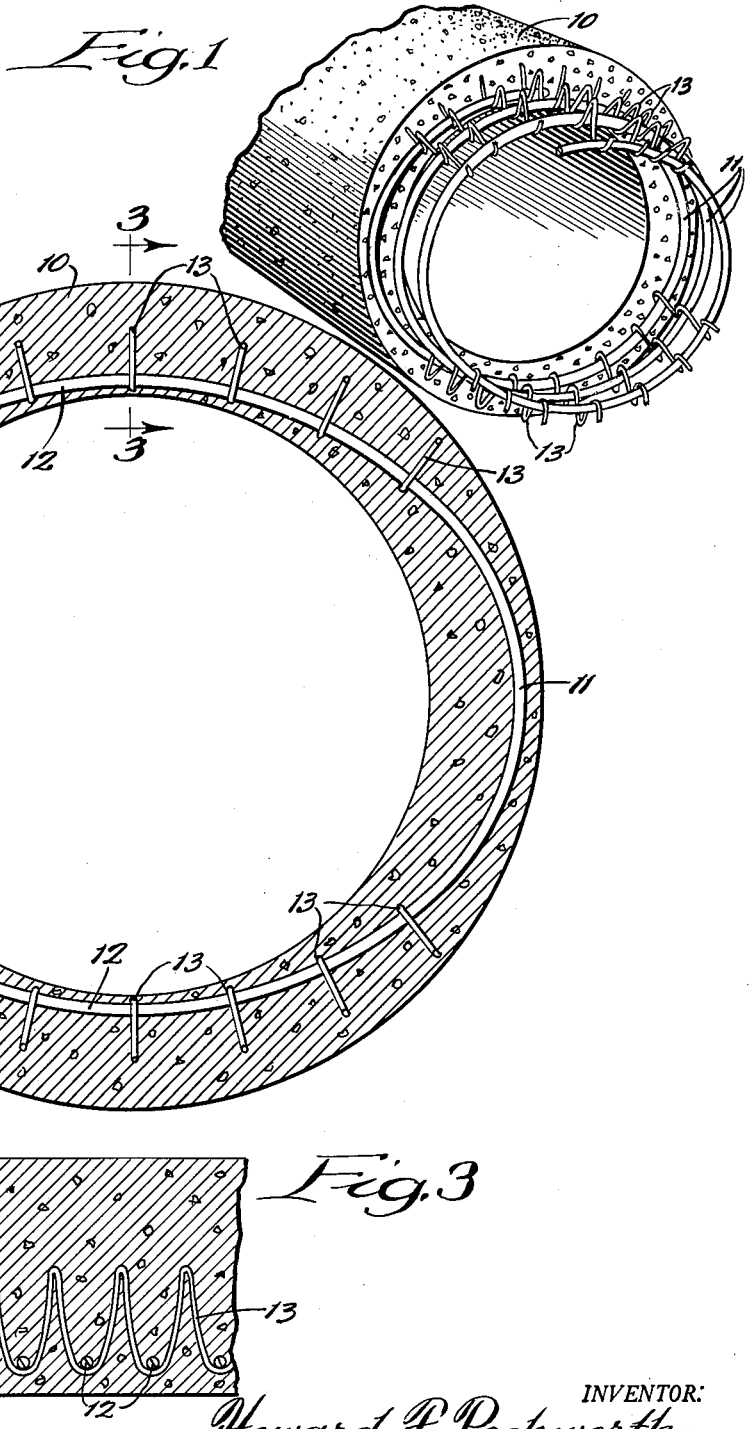
INVENTOR:
Howard F. Peckworth,
BY Dawson, Ormo, Britton and Spangenberg,
ATTORNEYS.

United States Patent Office 2,717,615
Patented Sept. 13, 1955

2,717,615

REINFORCED CONCRETE PIPE

Howard F. Peckworth, Batavia, Ill.

Continuation of abandoned application Serial No. 132,332, December 10, 1949. This application November 3, 1953, Serial No. 389,968

2 Claims. (Cl. 138—84)

This invention relates to reinforced concrete pipe and more particularly to metallic reinforcing to be imbedded in relatively large concrete pipe.

Concrete pipe has heretofore been reinforced by a metallic mesh or by coiled or looped reinforcing rods imbedded in the pipe at the time of its manufacture. In some cases the reinforcing structure has been made generally oval shaped with the flat parts of the ovals at the top and bottom of the pipe.

I have found that with pipe so constructed the reinforcing wires or rods will crush or shear the concrete and will break loose into the interior of the pipe before the wires or rods are fully stressed. In other words, the concrete fails in shear due to the load imposed on it by the reinforcing rods and full advantage is not taken of the strength of the rods.

It is one of the objects of the present invention to provide a reinforcing structure for concrete pipes which is so anchored in the pipe that it will not shear the concrete.

Specifically, it is an object of the invention to provide a reinforcing structure for concrete pipes in which the oval looped or coiled reinforcing wires or rods are anchored in the concrete pipe by reinforcing members secured to the wires or rods at a plurality of points spaced circumferentially along the flat parts of the oval and extending radially outward therefrom. In one construction, as illustrated, the reinforcing members are sinuously formed strips extending axially of the pipe.

The above and other objects, advantages and novel features of the invention will be more readily apparent from the following detailed description when read in connection with the accompanying drawing, in which:

Figure 1 is a perspective view of a reinforced concrete pipe embodying the invention with portions of the pipe broken away to show the reinforcing structure;

Figure 2 is a transverse section of the pipe; and

Figure 3 is a partial axial section on the line 3—3 of Figure 2.

The pipe as shown has a tubular cylindrical wall 10 of concrete of substantially uniform thickness, the wall being somewhat exaggerated for better illustration. The pipe may be in sections of any desired length and diameter but the present invention is particularly applicable to relatively large diameter pipe.

A tubular reinforcing structure of oval section is imbedded in the pipe wall with the flat parts of the oval at the top and bottom of the pipe. The reinforcing structure may be made in any desired manner such as by rolling and welding a woven mat, employing separate rings of wire or rod or employing a continuous coiled length of wire or rod. In any case the structure will provide loops of wire or rod extending around the pipe wall and spaced axially along the pipe.

As shown the reinforcing structure is formed of a continuous length of wire or rod 11 coiled into a series of oval loops with the flat parts of the ovals as indicated at 12 at the top and bottom of the pipe closely adjacent to the inner surface of the pipe wall. With this arrangement the wire or rod is placed in tension throughout when the pipe is buried or is otherwise loaded at its top. When so loaded the flat parts of the oval at the top and bottom of the pipe are highly stressed and will shear the concrete to destroy the pipe before the maximum strength of the reinforcement is utilized.

According to the present invention this difficulty is remedied by providing additional reinforcing members engaging and supporting the flat parts of the loops at a plurality of circumferentially spaced points and extending radially outward therefrom. In the construction shown, the reinforcing members are lengths of wire or rod 13 bent to sinuous form and looped under the reinforcing rod 11 at the flat parts of the oval loops. Any desired number of strips 13 may be employed for the necessary strength and they are laid parallel as shown radiating outward from the oval loops. Preferably the strips 13 are welded or wired to the rod 11 to provide an assembly which can be handled more easily during manufacture of the pipe.

The reinforcing structure of the present invention can be imbedded in the concrete pipe during its manufacture in the same manner as the reinforcements previously used. When installed, the loops of the strip 13 extend radially outward from the loops of the main reinforcing rods to at least the radial center of the pipe wall and anchor the rods securely in the concrete. A plurality of reinforcing members are provided securing the main reinforcing loops 11 in the pipe wall at a plurality of points spaced along the flat parts of the loops. Thus the main reinforcing rods 11 cannot shear the relatively thin mass of concrete separating them from the inner pipe wall at any point without first breaking or displacing at least one of the reinforcing members 13. Further, the reinforcing rods 11 can be made smaller and of stronger material without building up high unit shear stresses in the concrete due to the support provided by the reinforcing members 13. This reduces the quantity of steel in the completed pipe making for more economical manufacture and a stronger, better pipe. It will be noted that the reinforcing members 13 may be omitted at the sides of the pipe since an adequate thickness of concrete separates the rods 11 from the inner pipe wall at this point.

This application is a continuation of my co-pending application Serial No. 132,332 filed December 10, 1949, now abandoned.

While one embodiment of the invention has been shown and described in detail it will be understood that this is for illustration only and is not to be taken as a definition of the scope of the invention, reference being had for this purpose to the appended claims.

What is claimed is:

1. In combination, a tubular concrete pipe of circular section and of substantially uniform wall thickness, a metallic reinforcement including a series of spaced oval loops imbedded in the wall of the pipe with the flatter parts of the oval loops lying at the top and bottom of the pipe and closely adjacent to the inner surface of the pipe, and a plurality of circumferentially spaced reinforcing strips extending axially of the pipe, each of said strips being sinuously bent and looped under successive loops and secured thereto, said strips being circumferentially spaced along the flatter parts of the oval loops and distributed over the major portion of the length thereof only, and each strip having the portions thereof between successive oval loops extending radially outward at least to the radial center of the pipe wall.

2. In combination, a tubular concrete pipe of circular section and of substantially uniform wall thickness, a metallic reinforcement including a series of spaced oval loops imbedded in the wall of the pipe with the flatter parts of the oval loops lying at the top and bottom of the pipe and closely adjacent to the inner surface of the pipe, and a plurality of reinforcing members imbedded in the wall of the pipe and secured to each of the oval loops respectively at spaced points along the flatter portions thereof and distributed over the major portion of the length of such flatter portions only and extending generally radially outward therefrom at least to the radial center of the pipe wall.

References Cited in the file of this patent

UNITED STATES PATENTS

| | | |
|---|---|---|
| 468,269 | Stempel | Feb. 2, 1892 |
| 1,001,682 | Pratt | Aug. 29, 1911 |
| 1,644,196 | Longfellow | Oct. 4, 1927 |
| 2,164,625 | Prosser et al. | July 4, 1939 |
| 2,227,153 | Prosser | Dec. 31, 1940 |

FOREIGN PATENTS

| | | |
|---|---|---|
| 333,207 | Germany | Feb. 19, 1921 |
| 535,668 | France | Apr. 19, 1922 |